United States Patent Office 3,758,406
Patented Sept. 11, 1973

3,758,406
METHODS AND COMPOSITIONS FOR REDUCING FRICTIONAL PRESSURE LOSS IN THE FLOW OF HYDROCARBON LIQUIDS
William T. Malone, Marlin D. Holtmyer, John M. Tinsley, and Jiten Chatterji, Duncan, Okla., assignors to Halliburton Company, Duncan, Okla.
No Drawing. Continuation-in-part of abandoned application Ser. No. 878,578, Nov. 20, 1969. This application Oct. 22, 1971, Ser. No. 191,847
Int. Cl. C08f *3/66;* E21b *43/26;* F17d *1/16*
U.S. Cl. 252—8.55 R    15 Claims

ABSTRACT OF THE DISCLOSURE

The present invention relates to methods and compositions for reducing the frictional pressure loss encountered in the turbulent flow of hydrocarbon liquids through a conduit. By the present invention a frictional pressure loss additive is intermixed with the hydrocarbon liquid, the additive being a homopolymer or a copolymer of alkyl acrylate and methacrylate monomers having ester groups containing from 4 to 18 carbon atoms or copolymers of such monomers and certain styrene, acrylate or methacrylate type monomers.

CROSS-REFERENCE TO RELATED APPLICATIONS

This application is a continuation-in-part of application Ser. No. 878,578 filed Nov. 20, 1969, entitled, "Additive to Reduce Frictional Pressure Loss in Hydrocarbon Fluids" now abandoned.

The present invention relates to the reduction of frictional pressure loss encountered in the transfer of liquids by fluid flow. It is well known that when a liquid is pumped or otherwise caused to flow through a conduit under pressure, energy is expended as a result of friction, and a frictional pressure loss results. Such frictional pressure losses are particularly large under turbulent flow conditions. That is, when the velocity of a liquid passing through a conduit is such that turbulent flow results, a large frictional pressure loss is encountered. This problem of high frictional pressure loss or pressure drop in the flow of liquids through a conduit is commonly encountered in industrial operations wherein hydrocarbon liquids are conveyed through pipelines at high fluid velocities. For example, hydrocarbon liquids, both in the pure state and in admixture with other hydrocarbon liquids and components including suspended solid materials, are commonly transferred over considerable distances by pipeline. In addition, in the hydraulic fracturing of subterranean well formations, hydrocarbon fracturing fluids such as kerosene or crude oil with and without propping agents suspended therein are commonly pumped through long strings of tubing or pipe at high velocities in order to cause fracturing of the formations.

In order to compensate for the frictional pressure loss encountered in the turbulent flow of such hydrocarbon liquids, considerable energy generally in the form of pumping horsepower must be expended. Thus, reduction of the frictional pressure loss in the flow of such hydrocarbon liquids brings about an advantageous reduction in horsepower requirements, or alternatively, an increased flow rate of the hydrocarbon liquids under the same pumping conditions.

Heretofore, various methods and additives for reducing the frictional pressure loss encountered in the flow of gasoline and other hydrocarbon liquids have been developed. For example, a method of reducing the friction loss in flowing hydrocarbon liquids utilizing polyisobutylene is described and claimed in U.S. Pat. No. 3,215,154. While polyisobutylene as a frictional pressure loss reducing additive has achieved general acceptance, it suffers from several significant shortcomings. For example, polyisobutylene can only be polymerized with cationic initiators under cryogenic conditions using a low boiling solvent as a reaction medium. When polymerization is complete, the reaction medium is warmed to ambient temperatures which causes the solvent to evaporate leaving only the solid polymer. Dissolution of the solid polyisobutylene polymer is difficult and generally requires a large expenditure of time, heat and mechanical energy. When an additive concentrate prepared by dissolving the polyisobutylene resin in kerosene or other suitable liquid is utilized, the concentrate is generally limited to a maximum polymer content of from about 3% to 4% by weight due to the slow rate of solution of the polymer. In addition, polyisobutylene is extremely sensitive to shear and as a result, rapidly loses its ability to reduce frictional pressure loss in the turbulent flow of hydrocarbon liquids. Yet another shortcoming of polyisobutylene is its low degree of compatibility with water, i.e., if the hydrocarbon liquid to which polyisobutylene is added contains dissolved water, the friction reduction capability of polyisobutylene is reduced.

By the present invention, a small amount of a novel friction reducing additive, generally less than 0.3% by weight, is intermixed with a hydrocarbon liquid. The resulting mixture is flowed through a conduit at turbulent flow conditions with only a relatively small frictional pressure loss being encountered.

Broadly described, the friction reducing additive of the present invention is a polymer selected from the group consisting of:

(a) homopolymers and copolymers of the monomers

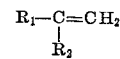

(b) copolymers of the monomers

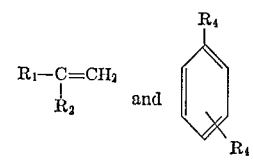

(c) copolymers of the monomers

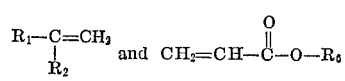

(d) copolymers of the monomers

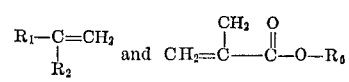

where $R_1$ is H or $CH_3$
$R_2$ is

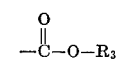

$R_3$ is an alkyl radical having from 4 to 18 carbon atoms
$R_4$ is $$-CH=CH_2 \text{ or } CH_3-C=CH_2$$

$R_5$ is hydrogen or an alkyl radical having from 1 to 2 carbon atoms
$R_6$ is an alkyl radical having 1 to 3 carbon atoms, at least 25% of the total weight of any of said copolymers being defined by the radical

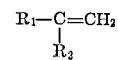

and said polymer having an intrinsic viscosity in butyl acetate of at least about 2 dl./g. at 25° C.

Examples of suitable monomers which may be utilized to form the polymer additives of the present invention are as follows:

2-ethylhexyl acrylate
isodecyl methacrylate
lauryl methacrylate
isobutyl acrylate
isobutyl methacrylate
cyclohexyl methacrylate
2-ethylbutyl methacrylate
n-hexyl methacrylate
2-ethylbutyl acrylate
n-hexyl acrylate
lauryl acrylate
n-octyl acrylate
n-butyl acrylate
n-octyldecyl acrylate
iso octydecyl methacrylate "Frictional pressure loss" is used herein to mean the loss or drop in pressure due to friction encountered in the flow of fluid through a conduit at a given velocity. Generally, frictional pressure loss is measured by the difference in pressure between two points in a conduit through which the liquid is flowing divided by the distance between such points. As used herein, the "reduction in frictional pressure loss" brought about by a particular friction reducing agent or additive is defined as the decrease in the differential pressure required to move the same fluid through a conduit over a unit of length at the same velocity.

By the present invention a polymer additive is provided which, when intermixed with a hydrocarbon liquid and the mixture flowed through a conduit, brings about superior reduction in frictional pressure loss.

The degree of polymerization of the polymer additive of the present invention must be such that the polymer exhibits viscolastic properties and yet is soluble in the hydrocarbon liquid at the required concentration. This requires a relatively high molecular weight, for example, a molecular weight of about 1,000,000 or greater. The defree of polymerization of the additives of the present invention is expressed herein in terms of intrinsic viscosity, i.e., an intrinsic viscosity in a good solvent of at least about 2 dl./g. at 25° C. is required. By a good solvent is meant one which actually solvates the molecule, that is, the polymer and solvent are in greatest contact with the polymer parts contacting the solvent and not the polymer. Butyl acetate has been found to be a good solvent for the polymers herein described. The determination of the intrinsic viscosity and the selection of suitable solvents, however, is readily within the ability of those skilled in the art, and accordingly a further description is not given herein.

The polymers of the present invention are preferably polymerized to the degree that the intrinsic viscosity at 25° C. in butyl acetate is from about 2 to about 10 dl./g. The upper limit, however, may vary significantly depending upon the particular polymer since the upper limit is controlled primarily by the solubility of the polymer in the hydrocarbon liquid.

As indicated previously, the novel polymer additives of the present invention may be homopolymers and copolymers of the monomers

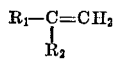

wherein $R_1$ is H or $CH_3$,
$R_2$ is

and $R_3$ is an alkyl radical having from 4 to 18 carbon atoms.

Additionally, copolymers produced from the above monomer and other monomers may be used, as long as the

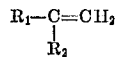

monomer is at least 25%, preferably at least 50% by weight of the total weight of the copolymer. Suitable other such monomers are

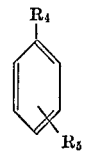

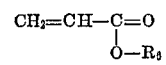

and

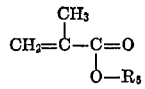

wherein
$R_4$ is

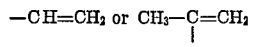

$R_5$ is hydrogen or an alkyl radical of 1 to 2 carbon atoms, and $R_6$ is an alkyl radical having from 1 to 3 carbon atoms.

Particularly useful copolymers have resulted from the polymerization of lauryl methacrylate with isodecyl methacrylate and from the polymerization of isodecyl methacrylate with 2-ethyl hexylacrylate.

A remarkably low concentration of the polymer additives of the present invention produce superior reduction in the frictional pressure loss of hydrocarbon liquids in turbulent flow. In hydrocarbon liquids such as gasoline, kerosene and crude oil, for example, concentrations of from about 0.25 to 20 pounds of additive per 1000 gallons of hydrocarbon liquid produce superior reductions in frictional pressure loss. However, the concentration of the polymer additives is preferably maintained at between 1 to 10 pounds per 1000 gallons of hydrocarbon liquid with a concentration of from about 1 to about 4 pounds of additive per 1000 gallons of hydrocarbon liquid being most preferred.

Below a polymer additive concentration in a hydrocarbon liquid of about 0.25 pounds per 1000 gallons of liquid (approximately .004 weight percent) insufficient additive is present to effectively bring about a reduction in friction pressure loss. The optimum quantity of polymer required will vary somewhat depending upon the molecular weight of the polymer used and the type of hydrocarbon liquid involved. In use of the polymer additive with hydrocarbon fracturing fluids, concentrations of from about 1 to about 4 pounds of additive per 1000 gallons of hydrocarbon fracturing fluid have been found to produce especially satisfactory results. However, when the polymer additive is used with a well-treating fluid containing sand or other solid agent suspended therein, it is preferable to use a somewhat larger amount of the polymer additive in the range of from about 1 to about 10 pounds per 1000 gallons. Under other conditions still higher concentrations of the additive up to about 20 pounds per 1000 gallons are useful. However, at concentrations of the additive above about 20 pounds per 1000 gallons of hydrocarbon liquid the viscosity of the treated liquid increases to the extent that it is detrimental to friction reduction as will be shown by the illustrative examples which follow.

The polymer additives of this invention have been found to exhibit excellent shear stability, that is, the additives are relatively insensitive to the effects of shear produced by turbulent flow. Stated another way, the excellent shear stability of the polymer additives of the present invention brings about a reduction in frictional pressure loss which decreases less in time than the frictional pressure loss reduction produced by additives used heretofore, such as polyisobutylene.

The polymer additives of the present invention are preferably prepared by standard emulsion polymerization techniques. Standard recipes for emulsion polymerization include four principal ingredients, namely, the monomer to be polymerized, water or mixtures of water and alcohol (the continuous phase), an emulsifier, and an initiator. In addition, certain reducing agents such as sodium bisulfite may be used to increase the rate of initiator dissociation and to reduce the inhibition period. Emulsifiers which may be used include sodium laurylsulfate, potassium laurate and potassium stearate. Suitable initiators include potassium persulfate, ammonium persulfate, cumyl hydroperoxide and other water soluble organic peroxides and hydroperoxides. Other agents may also be used and in place of sodium bisulfite, water soluble salts of iron (II), copper (I), chromium (II), cobalt (II), vanadium (II), and titanium (III) may be used.

As an example of the preparation of the polymers, the laboratory procedure for the emulsion polymerization of isodecyl methacrylate monomer is as follows:

A round bottom flask fitted with a suitable stirrer, a gas inlet, and a Liebig condenser with a gas outlet, is flushed with nitrogen or argon to remove atmospheric oxygen. The flask is then charged with the following ingredients in the following order: (1) emulsifier, initiator and reducing agent; (2) continuous phase; and (3) the monomer. The reaction vessel is subjected to a constant temperature, usually 50° to 60° C. Throughout the course of the reaction, the system is continuously flushed with an inert gas such as nitrogen or argon. The reaction runs for a period of from three to six hours at which time the polymer latex may be coagulated and removed by the addition of an emulsion breaker such as methanol or ethanol to the reaction product, followed by filtration and drying under vacuum.

In the practice of this invention, a polymer additive having a molecular weight of about 1,000,000 or greater i.e., an intrinsic viscosity in butyl acetate at 25° C. of at least 2 dl./g., and preferably in the range of about from 2 to about 10 dl./g., is intermixed with a hydrocarbon liquid in an amount of at least 0.25 pound per 1000 gallons of the hydrocarbon liquid. The polymer additive may be intermixed with the hydrocarbon fluid directly or the additive may be predissolved in a concentrate which may be intermixed with the hydrocarbon liquid. While the polymer additive may be produced in the solid state and then dissolved in the hydrocarbon liquid or in a suitable concentrate liquid, the preferred method of intermixing the polymer additive with a hydrocarbon fluid is to add the polymer in the emulsified state as produced by the emulsion polymerization reaction. As is understood by those skilled in the art, the product from an emulsion polymerization reaction is a liquid, i.e., the polymer is dispersed in water in the form of an emulsion. The polymer in this emulsified state is intermixed directly with the hydrocarbon liquid and an emulsion breaker is simultaneously added thereto. As the emulsion is broken by the emulsion breaker, the minute polymer particles originally dispersed in the emulsion are rapidly dissolved in the hydrocarbon liquid. Suitable emulsion breakers which may be used are low molecular weight alkanols such as methanol and ethanol, and commercially available cationic surface active agents.

The polymer additives of the present invention are preferably predissolved in kerosene or other suitable hydrocarbon liquid to form an additive concentrate. The dissolution of the polymer in the concentrate solvent is carried out as described above, i.e., the polymer in water emulsion form is added to the solvent along with an emulsion breaker. The concentration of the polymer in the concentrate may vary up to about 8% by weight. However, if the concentration of the polymer is increased much above about 8% by weight, the resulting concentrate solution is too viscous to be handled easily.

The friction reduction additive concentrate may be continuously intermixed or batch-mixed with the hydrocarbon fluid to be treated. Once the additive is combined with the hydrocarbon fluid it is pumped or otherwise caused to flow through a conduit at turbulent flow conditions with superior reduction in frictional pressure loss being obtained.

As an example of the preparation of a polymer additive concentrate of this invention, a mixing tank is charged with 1070 gallons of kerosene. Then, a quantity of a poly (isodecyl methacrylate) emulsion product from an emulsion polymerization reaction, the poly (isodecyl methacrylate) having an intrinsic viscosity at 25° C. in butyl acetate of 5 dl./g. is added to the kerosene along with sufficient methanol to break the emulsion. The mixture is stirred to insure the intermixing of the kerosene, polymer emulsion and alcohol. As soon as sufficient polymer has been added to the kerosene to produce a concentration of 6.1% by weight of polymer in the kerosene (a total of approximately 194 gallons of emulsion) along with sufficient isopropyl alcohol to break the emulsion (approximately 186 gallons) the stirring is discontinued. The resulting concentrate may be stored for an indefinite period of time without visible detrimental effects.

As an example of a particularly effective embodiment of this invention for the hydraulic fracturing of a subterranean well formation, a quantity of the poly (isodecyl methacrylate) concentrate prepared as described above equal to 10 gallons per 1000 gallons of fracturing fluid is provided at the well site. After the well formation to be fractured is preconditioned in a conventional manner, a kerosene fracturing fluid including the polymer additive concentrate as well as fluid loss and other conventional additives having conventional solid propping agent suspended therein is pumped into the well formation through 6000 feet of standard 1.995 inch I.D. tubing. The kerosene fracturing fluid, having a concentration of 4.8 pounds of polymer per 1000 gallons, is pumped at a rate of 10 barrels per minute at a surface pressure of 3800 p.s.i.g. subjecting the formation to a fracturing pressure of 4200 p.s.i. The absence of the polymer additive in the kerosene fracturing fluid will result in a surface pressure of 9300 p.s.i.g. under identical well conditions. This in turn will require an additional 1350 hydraulic horsepower.

The term "hydrocarbon liquid" as used herein refers to those hydrocarbon compounds and mixtures thereof, with or without solids suspended therein and containing other conventional additives, which are in the liquid state at atmospheric conditions, have a viscosity such that they are pumpable and have sufficient solvency for the polymers of the present invention to dissolve desired quantities thereof. Such hydrocarbon liquids include petroleum products such as crude oil, gasoline, kerosene and fuel oil as well as straight and branched chain paraffin hydrocarbons, cyclo-paraffin hydrocarbons, mono-olefin hydrocarbons, diolefin hydrocarbons, alkene hydrocarbons and aromatic hydrocarbons such as benzene, toluene and xylene.

As previously stated, this invention relates to methods and compositions for reducing the frictional pressure loss of a hydrocarbon liquid moved through a conduit under turbulent flow conditions. Turbulent flow conditions are well understood by those skilled in the art and a detailed discussion is not given herein. However, turbulence causing an appreciable frictional pressure loss in hydrocarbon liquids which may be reduced by the intermixing of the polymer additives of the present invention with the hydrocarbon liquids results at flow rates which give a Reynolds number for the base hydrocarbon liquid above about 3000 as defined by the following relationship:

$$N_R = \frac{dv\rho}{\mu}\ ^{1,2}$$

where:

$N_R$ = Reynolds number, Newtonian fluid
$d$ = Inside diameter of pipe
$v$ = Average flow velocity
$\rho$ = Density of fluid
$\mu$ = Absolute viscosity (Newtonian fluid)

[1] Reynolds, O.: Proc. Manchester Lit. Phil. Loc., 8 (1874).
[2] Moody, L. F.: Trans. ASME, 66, 671 (1944).

In order to present a clear understanding of the frictional pressure loss reduction additives and methods of the present invention, the following examples are given. For convenience of discussion, the abbreviations for the polymers given in Table I below are used in the examples.

TABLE I

Abbreviations

| Polymer: | Abbreviation |
|---|---|
| Poly (2-ethylhexyl acrylate) | 2EHA. |
| Poly (isobutyl acrylate) | iBA. |
| Poly (lauryl methacrylate) | LMA. |
| Poly (isodecyl methacrylate) | iDMA. |
| Poly (isobutyl methacrylate) | iBMA. |
| Poly (isodecyl methacrylate-colauryl methacrylate) | iDMA-LMA. |
| Poly (2-ethylhexyl acrylate-coisobutyl acrylate) | 2EHA-iBA. |
| Poly (2 - ethylhexyl acrylate-coisobutyl methacrylate) | 2EHA-iBMA. |
| Poly (2 - ethylhexyl acrylate-coisodecyl methacrylate) | 2EHA-iDMA. |
| Poly (isodecyl methacrylate-costyrene | iDMA-S. |

In the examples which follow, friction reduction properties of the polymers listed in Table I are given. Friction reduction properties are determined by intermixing the polymers with a hydrocarbon liquid (kerosene) and pumping the liquid mixture from a container through a six-foot section of ⅜-inch pipe and back through the container. The pressure drop in the section of pipe is continuously measured and recorded on an X–Y plotter (a conventional device which records percent reduction on the Y axis and time on the X axis). The percent of reduction in friction pressure loss is measured both initially and after a period of time. A zero reading, established with only kerosene flowing through the pipe, on the X–Y plotter indicates no reduction in friction, and a 100 reading, established with no fluid flow, indicates no friction at all. Thus, the higher the reading on the X–Y plotter the more effective the polymer additive tested is in reduction of friction pressure loss. Each polymer tested is predissolved in kerosene and added at 60 seconds from the beginning of each test run. The intrinsic viscosity of each polymer tested is determined in a conventional manner.

EXAMPLE 1

A series of alkyl methacrylate and acrylate polymers of various molecular weights are polymerized at a temperature of 60° C. by the emulsion polymerization method with the relative concentrations of the ingredients being: water 29.0 grams, methanol 7.2 grams, emulsifier 1.0 grams, monomer 20.0 grams and initiator from 0.1 to 0.003 grams. The friction reduction properties of the polymers are as follows:

TABLE II.—FRICTION REDUCTION PROPERTIES OF VARIOUS POLYMERS IN KEROSENE

| Polymer | Concentration, pounds/ 1,000 gals. kerosene | Percent friction reduction after 1 min. | Molecular weight ×10⁵ | Intrinsic viscosity [1] dl./g. |
|---|---|---|---|---|
| LMA | 2 | 28 | 8.3 | 2.3 |
| LMA | 4 | 38 | 8.3 | 2.3 |
| LMA | 2 | 43 | 10.0 | 2.6 |
| LMA | 4 | 53 | 10.0 | 2.6 |
| LMA | 2 | 46 | 13.0 | 3.0 |
| LMA | 4 | 56 | 13.0 | 3.0 |
| LMA | 2 | 58 | 14.0 | 3.2 |
| LMA | 4 | 68 | 14.0 | 3.2 |
| LMA | 2 | 56 | 15.0 | 3.4 |
| LMA | 4 | 66 | 15.0 | 3.4 |
| iDMA | 2 | 67 | 20.0 | 4.1 |
| iDMA | 4 | 72 | 20.0 | 4.1 |
| iDMA | 2 | 76 | 26.0 | 4.9 |
| iDMA | 4 | 77 | 26.0 | 4.9 |
| 2EHA | 2 | 27 | 13.0 | 3.1 |
| 2EHA | 4 | 36 | 13.0 | 3.1 |
| 2EHA | 2 | 44 | 15.0 | 3.4 |
| 2EHA | 4 | 56 | 15.0 | 3.4 |
| 2EHA | 2 | 55 | 23.0 | 4.5 |
| 2EHA | 4 | 64 | 23.0 | 4.5 |

[1] At 25° C. in butyl acetate.

From the foregoing it may be seen that with increasing polymer molecular weights increased reduction in frictional pressure loss is obtained.

EXAMPLE 2

The friction reduction properties of various homopolymers and copolymers of the present invention are given in Table III:

TABLE III.—FRICTION REDUCTION PROPERTIES OF VARIOUS HOMOPOLYMERS AND COPOLYMERS

| Polymer | Concentration, pounds/ 1,000 gallons kerosene | Percent friction reduction |
|---|---|---|
| iBMA | 4 | 76 |
| 2EHA | 2 | 62 |
| 2EHA | 2 | 60 |
| 2EHA | 4 | 68 |
| iBA | 2 | 4 |
| iBA | 4 | 16 |
| 2EHA (50%)-iBA (50%) | 2 | 48 |
| 2EHA (50%)-iBA (50%) | 4 | 59 |
| 2EHA (75%)-iBA (25%) | 2 | 37 |
| 2EHA (75%)-iBA (25%) | 4 | 49 |
| 2EHA (25%)-iBA (75%) | 2 | 37 |
| 2EHA (25%)-iBA (75%) | 4 | 47 |
| 2EHA (50%)-iBA (50%) | 2 | 41 |
| 2EHA (50%)-iBA (50%) | 4 | 40 |
| 2EHA (50%)-iBA (50%) | 2 | 51 |
| 2EHA (50%)-iBA (50%) | 4 | 61 |
| 2EHA (50%)-iDMA (50%) | 2 | 58 |
| 2EHA (50%)-iBA (50%) | 4 | 67 |
| iDMA (50%)-S (50%) | 2 | 44 |
| iDMA (50%)-S (50%) | 4 | 52 |
| iDMA (66%)-LMA (34%) | 2 | 79 |
| iDMA (66%)-LMA (34%) | 4 | 80 |

EXAMPLE 3 iDMA, having an intrinsic viscosity at 25° C. in butyl acetate of 5.5 dl./g. is produced by the emulsion polymerization procedure using 20.0 grams monomer, 29.0 grams water, 0.004 gram initiator (potassium persulfate), 7.2 grams methanol and 1 gram of sodium laurylsulfate emulsifier at a polymerization temperature of 60° C. The friction reduction properties of such polymer are given in Table IV below.

TABLE IV.—FRICTION REDUCTION PROPERTIES OF iDMA

| Polymer | Concentration lbs./ 1,000 gal. kerosene | Initial | Final after 9 minutes | Difference |
|---|---|---|---|---|
| iDMA | 2 | 80 | 51 | 23 |
| iDMA | 4 | 79 | 67 | 12 |

EXAMPLE 4

The friction reduction properties of iDMA are compared with those of commercially available polyisobutylene as follows:

TABLE V.—FRICTION REDUCTION PROPERTIES OF iDMA COMPARED WITH POLYISOBUTYLENE

| Additive | Base fluid | Concentration, lbs./1,000 gal. | Percent friction reduction | | |
|---|---|---|---|---|---|
| | | | Initial | Final after 9 minutes | Difference |
| iDMA [1] | Kerosene | 4 | 79 | 64 | 15 |
| Polyisobutylene | do | 4 | 75 | 37 | 38 |
| iDMA [1] | QC-1156 [2] | 4 | 78 | 64 | 14 |
| Polyisobutylene | QC-1156 | 4 | 76 | 31 | 45 |
| iDMA [1] | Cardium crude | 4 | 69 | 55 | 14 |
| Polyisobutylene | do | 4 | 67 | 34 | 33 |

[1] Intrinsic viscosity of 5.5 dl./g. at 25° C. in butyl acetate.
[2] QC-1156 is primarily an aromatic hydrocarbon with an API gravity of 22.5° and a boiling point in the range of 395–500° F.

As can be seen from the data given in Table V, the polymer additives of this invention exhibit greater shear stability than polyisobutylene. In each of the comparative tests shown, polyisobutylene gave a greater decrease in percent friction reduction with time than iDMA. Further, in each instance, the decrease is greater than two times the decrease when using iDMA. Thus, polyisobutylene is considerably more sensitive to shear and is not as effective an additive to reduce frictional pressure loss as the polymer additives of this invention.

EXAMPLE 5

The effect of water on the friction reduction capability of polyisobutylene and iDMA is also compared. The percent friction reduction obtained with iDMA at a concentration of 4 pounds per 1000 gallons of kerosene is 76%. The friction reduction under the same conditions using polyisobutylene is 74%. When the kerosene contains 5% by volume dissolved water, the percent friction reduction using iDMA is 70%, but the percent friction reduction using polyisobutylene is only 63%. Thus, the presence of 5% water in the kerosene reduced the percent friction reduction of polyisobutylene 11% as compared to only 6% when using the iDMA.

EXAMPLE 6

The effect of increasing concentration of the polymer additives of the present invention on reduction of friction pressure loss and viscosity of the resulting hydrocarbon polymer mixture is shown in Table VI below.

TABLE VI.—EFFECT OF INCREASING iDMA CONCENTRATION ON FRICTION REDUCTION PROPERTIES AND MIXTURE VISCOSITY

| Concentration pounds polymer/ 1,000 gallons kerosene | Percent friction reduction | Viscosity [1] at 100° F. (centistokes) |
|---|---|---|
| 0.0 | 0.0 | 1.53 |
| 1.0 | 82.0 | 1.65 |
| 2.0 | 80.0 | 1.80 |
| 4.0 | 78.0 | 2.03 |
| 8.0 | 74.0 | 2.67 |
| 16.0 | 70.0 | 4.07 |
| 24.0 | 66.0 | 4.33 |
| 32.0 | 62.0 | 9.59 |
| 40.0 | 58.0 | 13.64 |
| 48.0 | 55.0 | 18.64 |
| 56.0 | 52.0 | 24.96 |
| 64.0 | 48.0 | 33.04 |

[1] Viscosity data shown here is average of three readings.

From the data shown in Table VI, it may be seen that increasing the concentration of the polymer additive above a concentration of about 20 pounds per 1000 gallons increases the viscosity of the resulting mixture and substantially decreases the friction reduction obtainable.

EXAMPLE 7

The friction reduction properties of LMA and 2EHA at various concentrations are given in Table VII below:

TABLE VII.—FRICTION REDUCTION PROPERTIES OF POLYMER ADDITIVES AT VARIOUS CONCENTRATIONS

| Polymer additive | Concentration, pounds additive/ 1,000 gallons kerosene | Percent friction reduction |
|---|---|---|
| 2EHA | 5.0 | 71.0 |
| | 10.0 | 73.0 |
| | 15.0 | 74.0 |
| | 20.0 | 73.0 |
| LMA | 5.0 | 63.0 |
| | 10.0 | 68.0 |
| | 15.0 | 67.0 |
| | 20.0 | 67.0 |

What is claimed is:

1. A liquid hydrocarbon base hydraulic well fracturing fluid composition comprising a hydrocarbon liquid selected from the group consisting of crude oil, gasoline, kerosene, fuel oil, benzene, toluene and xylene having dissolved therein from about 0.25 pounds to about 20 pounds of an additive per 1000 gallons of said liquid, said additive being selected from the group consisting of:

(a) homopolymers and copolymers of the monomers $$R_1-C=CH_2$$
$$|$$
$$R_2$$

(b) copolymers of the monomers $$R_1-C=CH_2 \quad \text{and} \quad \text{(phenyl with } R_4, R_5\text{)}$$
$$|$$
$$R_2$$

(c) copolymers of the monomers $$R_1-C=CH_2 \quad \text{and} \quad CH_2=CH-C=O$$
$$|\qquad\qquad\qquad\qquad\qquad\qquad |$$
$$R_2 \qquad\qquad\qquad\qquad\qquad\qquad O-R_6$$

(d) copolymers of the monomers $$R_1-C=CH_2 \quad \text{and} \quad CH_2=C-C=O$$
$$|\qquad\qquad\qquad\qquad\qquad\quad |\quad\ |$$
$$R_2 \qquad\qquad\qquad\qquad\qquad CH_3\ O-R_6$$

where
$R_1$ is H or $CH_3$
$R_2$ is $$-C=O$$
$$|$$
$$O-R_3$$

$R_3$ is an alkyl radical having 4 to 18 carbon atoms,
$R_4$ is $$-CH=CH_2 \quad \text{or} \quad CH_3-C=CH_2$$
$$|$$

$R_5$ is hydrogen or an alkyl radical having from 1 to 2 carbon atoms, and
$R_6$ is an alkyl radical having 1 to 3 carbon atoms, at least 25% of the total weight of any of said copolymers being defined by the radical $$R_1-C=CH_2$$
$$|$$
$$R_2$$

and said polymer having an intrinsic viscosity in butyl acetate of at least about 2 dl./g. at 25° C.

2. The fracturing fluid composition of claim 1 wherein said additive is present therein in an amount of from about 1 pound to about 10 pounds per 100 gallons of said hydrocarbon liquid.

3. The fracturing fluid composition of claim 1 wherein the intrinsic viscosity in butyl acetate of said additive is from about 2 to about 10 dl./g.

4. The fracturing fluid composition of claim 3 wherein said hydrocarbon liquid is kerosene and said additive is poly (isodecyl methacrylate).

5. A method of reducing the frictional pressure loss encountered in the turbulent flow of a hydrocarbon liquid through a conduit comprising the steps of:
   intermixing with said hydrocarbon liquid from about 0.25 pound to about 20 pounds of an additive per 1000 gallons of said liquid, said additive being selected from the group consisting of:
(a) homopolymers and copolymers of the monomers $$R_1-C=CH_2$$
$$|$$
$$R_2$$

(b) copolymers of the monomers $$R_1-C=CH_2 \text{ and } \bigodot_{R_5}^{R_4}$$

(c) copolymers of the monomers $$R_1-C=CH_2 \text{ and } CH_2=CH-C=O$$
$$|\qquad\qquad\qquad\qquad\qquad |$$
$$R_2\qquad\qquad\qquad\qquad\qquad O-R_6$$

(d) copolymers of the monomers $$R_1-C=CH_2 \text{ and } CH_2=\overset{CH_3}{\underset{|}{C}}-C=O$$
$$|\qquad\qquad\qquad\qquad\qquad\qquad |$$
$$R_2\qquad\qquad\qquad\qquad\qquad\qquad O-R_6$$

where
$R_1$ is H or $CH_3$
$R_2$ is $$-C=O$$
$$|$$
$$O-R_3$$

$R_3$ is an alkyl radical having from 4 to 18 carbon atoms,
$R_4$ is $$-CH=CH_2 \text{ or } CH_3-C=CH_2$$
$$|$$

$R_5$ is hydrogen or an alkyl radical having 1 to 2 carbon atoms, and
$R_6$ is an alkyl radical having 1 to 3 carbon atoms,
at least 25% of the total weight of any of said copolymers being defined by the radical $$R_1-C=CH_2$$
$$|$$
$$R_2$$

and said polymer having an intrinsic viscosity of at least 2 dl./g. at 25° C.; and
flowing the resulting mixture through said conduit.

6. The method of claim 5 wherein said additive is intermixed with said hydrocarbon liquid in an amount of from about 1 pound to about 10 pounds per 1000 gallons of said liquid.

7. The method of claim 5 wherein said intrinsic viscosity of said aditive is from about 2 to about 10 dl./g.

8. The method of claim 5 wherein said additive is intermixed with said hydrocarbon liquid as a concentrate, said concentrate containing up to about 8% of said additive by weight in a hydrocarbon solvent for said additives.

9. The method of claim 8 wherein said solvent is kerosene.

10. A method of hydraulically fracturing a subterranean well formation penetrated by a well bore having a conduit disposed therein which comprises:
   pumping through said conduit and into said formation a hydrocarbon fracturing fluid having dissolved therein a frictional pressure loss reducing additive in an amount of from about 0.25 pound to about 20 pounds of additive per 1000 gallons of fracturing fluid, said additive being selected from the group consisting of:
(a) homopolymers and copolymers of the monomers $$R_1-C=CH_2$$
$$|$$
$$R_2$$

(b) copolymers of the monomers $$R_1-C=CH_2 \text{ and } \bigodot_{R_5}^{R_4}$$

(c) copolymers of the monomers $$R_1-C=CH_2 \text{ and } CH_2=CH-C=O$$
$$|\qquad\qquad\qquad\qquad\qquad |$$
$$R_2\qquad\qquad\qquad\qquad\qquad O-R_6$$

(d) copolymers of the monomers $$R_1-C=CH_2 \text{ and } CH_2=\overset{CH_3}{\underset{|}{C}}-C=O$$
$$|\qquad\qquad\qquad\qquad\qquad\qquad |$$
$$R_2\qquad\qquad\qquad\qquad\qquad\qquad O-R_6$$

where
$R_1$ is H or $CH_3$
$R_2$ is $$-C=O$$
$$|$$
$$O-R_3$$

$R_3$ is an alkyl radical having from 4 to 18 carbon atoms,
$R_4$ is $$-CH=CH_2 \text{ or } CH_3-C=CH_2$$
$$|$$

$R_5$ is hydrogen or an alkyl radical having 1 to 2 carbon atoms, and
$R_6$ is an alkyl radical having 1 to 3 carbon atoms,
at least 25% of the total weight of any of said copolymers being defined by the radical $$R_1-C=CH_2$$
$$|$$
$$R_2$$

and said polymer having an intrinsic viscosity of at least about 2 dl./g. at 25° C.; and
continuing said pumping until said formation is subjected to sufficient pressure to cause fracturing of said formation.

11. The method of claim 10 wherein said frictional pressure loss reducing additive is present in said hydrocarbon fracturing fluid in an amount of from about 1 pound to about 10 pounds per 1000 gallons of said fluid, 12. The method of claim 10 wherein said intrinsic viscosity of said additive is from about 2 to about 10 dl./g.

13. The method of claim 10 which is further characterized to include the step of:

intermixing said additive with said fracturing fluid so that said additive is dissolved therein prior to pumping said fracturing fluid through said conduit.

14. The method of claim 13 wherein said additive is intermixed with said hydrocarbon liquid as a concentrate, said concentrate containing up to about 8% of said additive by weight in a hydrocarbon solvent for said additives.

15. The method of claim 14 wherein said solvent is kerosene.

References Cited
UNITED STATES PATENTS

| | | | |
|---|---|---|---|
| 2,407,954 | 9/1946 | Fenske et al. | 252—52 |
| 2,604,453 | 7/1952 | Popkin | 252—56 |
| 2,411,150 | 11/1946 | Evans et al. | 252—56 |
| 2,492,173 | 11/1949 | Mysels | 137—13 |
| 3,215,154 | 11/1965 | White et al. | 137—13 |
| 2,409,333 | 10/1946 | Wright et al. | 252—59 |
| 3,105,047 | 9/1963 | Miller et al. | 252—8.55 |
| 3,507,932 | 4/1970 | Morduchowitz et al. | 260—836 |
| 3,654,994 | 4/1972 | Slagel et al. | 166—308 |
| 3,598,736 | 8/1971 | Van Der Meij et al. | 252—56 |

HERBERT B. GUYNN, Primary Examiner

U.S. Cl. X.R.

137—13; 166—308; 260—89.5 A